(12) United States Patent
Clapsaddle

(10) Patent No.: US 8,500,009 B2
(45) Date of Patent: Aug. 6, 2013

(54) REAL-TIME INTERNET METHOD FOR TRACKING NUMBER AND GENDER OF PATRONS IN BAR AND NIGHT CLUB ESTABLISHMENTS

(76) Inventor: Daniel J. Clapsaddle, Ossining, NY (US)

( * ) Notice: Subject to any disclaimer, the term of this patent is extended or adjusted under 35 U.S.C. 154(b) by 0 days.

(21) Appl. No.: 13/316,598

(22) Filed: Dec. 12, 2011

(65) Prior Publication Data

US 2012/0312872 A1 Dec. 13, 2012

Related U.S. Application Data

(60) Provisional application No. 61/445,719, filed on Feb. 23, 2011.

(51) Int. Cl.
*G06K 5/00* (2006.01)
(52) U.S. Cl.
USPC .......................................... 235/380; 235/382
(58) Field of Classification Search
USPC ................................ 235/380, 382, 382.5, 381
See application file for complete search history.

(56) References Cited

U.S. PATENT DOCUMENTS

| | | | | |
|---|---|---|---|---|
| 6,196,460 | B1 * | 3/2001 | Shin | 235/380 |
| 7,152,787 | B2 * | 12/2006 | Cheng | 235/380 |
| 8,201,738 | B2 * | 6/2012 | Hotto et al. | 235/386 |
| 2006/0195361 | A1 * | 8/2006 | Rosenberg | 705/14 |
| 2007/0223533 | A1 * | 9/2007 | Kirrmann et al. | 370/469 |
| 2008/0010151 | A1 * | 1/2008 | Bridges et al. | 705/14 |

* cited by examiner

*Primary Examiner* — Thien M Le
(74) *Attorney, Agent, or Firm* — Epstein Drangel LLP; Robert L. Epstein

(57) ABSTRACT

A computer-readable medium containing instructions for a computer to perform a method for tracking visitors at bar or night club establishments having scanners capable of scanning the driver's license of each visitor entering the establishment. After scanning, the validity of the license is verified, as is whether the visitor is above the legal drinking age, and an identification code is associated with each such visitor. The time that the scan took place is recorded and the gender of the visitor is ascertained. The information is sent to and stored on the system server. The system server tallies the gender information for visitors associated with an identification code at each establishment. The population, tallied gender ratio and a calculated gender rate ratio for each establishment are displayed on a system website. System subscribers are permitted to access the displayed information on the system website.

26 Claims, 4 Drawing Sheets

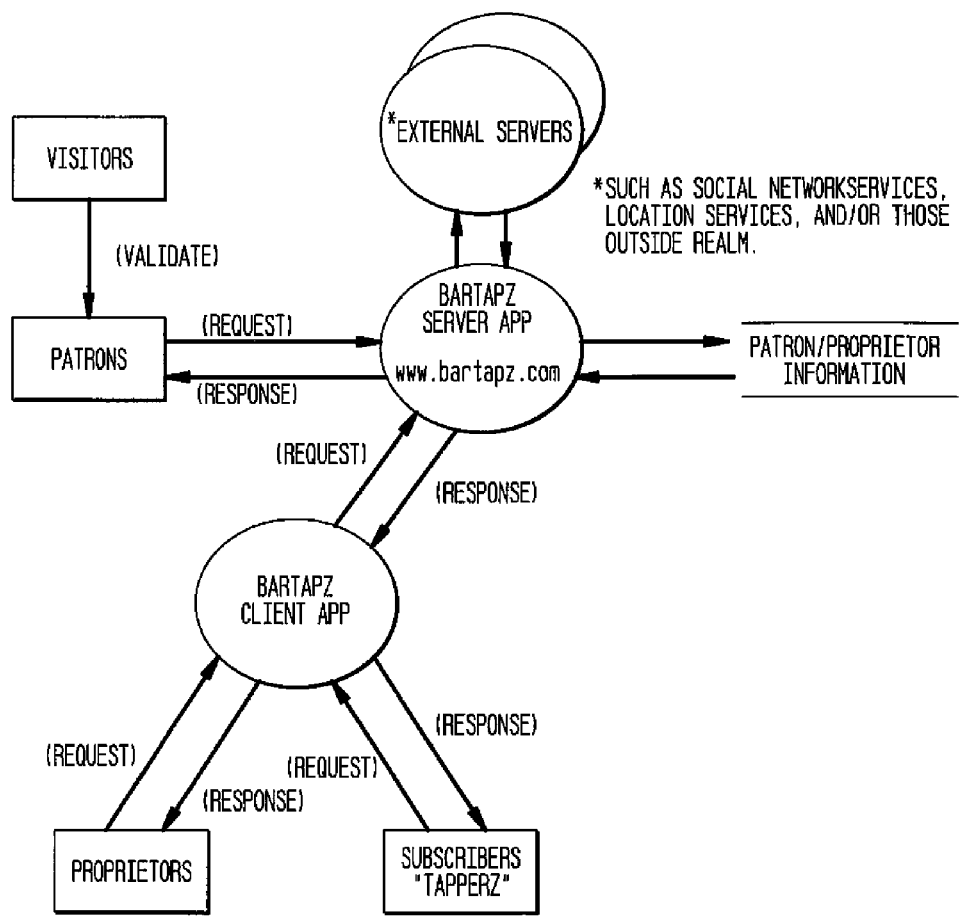

REAL-TIME INTERNET METHOD FOR TRACKING NUMBER AND GENDER OF PATRONS IN BAR AND NIGHT CLUB ESTABLISHMENTS

CROSS-REFERENCE TO RELATED APPLICATIONS

Priority is claimed on Provisional Patent Application Ser. No. 61/445,719, filed Feb. 23, 2011.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a real-time internet method of tracking the number and gender of patrons in bar or night club establishments, and more particularly to computer-implemented software for a website and smart phone application that allows system subscribers to review information regarding offerings and special features provided by such establishments, including real-time statistics relating to the size and gender ratio of the patron population in such establishments.

2. Description of Prior Art Including Information Disclosed Under 37 CFR 1.97 and 1.98

For planning an evening out at a bar, night club or similar eating and drinking establishment, it is helpful to obtain information about the products and services offered by various establishments, including food and beverages being offered, the pricing of the food and beverages, minimum and cover charges, special offerings, the type of live entertainment being provided, and the like. Moreover, a decision as to which establishment or series of establishments to frequent may include consideration of the number of patrons present in a particular establishment, as well as the gender ratio of the patron population in a particular establishment at a given time.

At the same time, proprietors of establishments that offer alcoholic beverages are concerned about serving alcoholic beverages to individuals in their establishment that are below the legal drinking age, which may be a violation state liquor laws and possibly result in criminal or civil liability. Accordingly, it is necessary for proprietors of such establishments to carefully check the identification documents of visitors entering their establishments to confirm that they are above the legal drinking age. That task is usually accomplished by manually examining the automobile driver's licenses presented by the visitors as they seek entrance to the establishment.

Accordingly, there is a need for a system whereby an individual can remotely access a website, for example through a software application on a mobile communications device, to obtain useful information about what is taking place at establishments of interest, as well as real-time tallies of the size of the patron population and of the gender make-up of the patron population in such establishments.

Further, there is a need for a system by which the proprietor of an establishment can quickly and reliably ascertain the age of visitors seeking entrance to the establishment by scanning the driver's licenses of visitors seeking to enter the establishment and immediately verifying the validity of the license and of the scanned information to enable the proprietor of the establishment to refuse entry to those visitors who display invalid credentials or are below the legal drinking age.

The method of the present invention meets the goals of subscribers planning their activities, by providing real-time patron population and gender statistics via the Internet, as well as the goals of the proprietors of establishments serving alcoholic beverages, by providing immediate verification of credentials presented by visitors seeking entrance to their establishments and by providing a means of advising prospective patrons of the goods and services offered by their establishments.

BRIEF SUMMARY OF THE INVENTION

It is, therefore a prime object of the present invention to provide a real-time internet method for tracking the population and gender of patrons in bar and night club establishments.

It is another object of the present invention to provide a real-time internet method for tracking the population and gender of patrons in bar and night club establishments wherein each establishment is provided with a scanner capable of reading information from a driver's license presented by a visitor seeking entrance to the establishment.

It is another object of the present invention to provide a real-time internet method for tracking the population and gender of patrons in bar and night club establishments wherein the age of a visitor seeking entrance to the establishment can be quickly and reliably established by the proprietor of the establishment.

It is another object of the present invention to provide a real-time internet method for tracking the population and gender of patrons in bar and night club establishments wherein the validity of driver's licenses presented by visitors seeking entrance to the establishment, and the information scanned therefrom, can be automatically authenticated by the establishment proprietor to verify the age of a visitor seeking entrance to the establishment.

It is another object of the present invention to provide a real-time internet method for tracking the population and gender of patrons in bar and night club establishments including a system web site which permits subscribers to access information about the establishment and a smart phone application that allows subscribers to remotely track, via the internet, the number of patrons that have entered a particular establishment, as well as the gender ratio of that patron population.

It is another object of the present invention to provide a real-time internet method for tracking the population and gender of patrons in bar and night club establishments including a system website for providing information as to the location of and directions to such establishments, a link to the establishment's own website, and allows establishment proprietors to advertise their menus, drink specials, happy hours, entertainment showcases, etc.

It is another object of the present invention to provide a real-time internet method for tracking the population and gender of patrons in bar and night club establishments including a system website by which proprietors of such establishments can provide downloadable coupons for their establishments to system subscribers.

It is another object of the present invention to provide a real-time internet method for tracking the population and gender of patrons in bar and night club establishments wherein subscribers can use a smart phone application to locate preselected individuals that may have entered a particular establishment.

It is another object of the present invention to provide a real-time internet method for tracking the population and gender of patrons in bar and night club establishments wherein subscribers can use a smart phone application to obtain patron population and gender ratio information for establishments by location based upon the country, state, county or region in which the establishment is located, and can focus the search to a local area by using the zip code.

It is another object of the present invention to provide a real-time internet method for tracking the population and gender of patrons in bar and night club establishments using smart phone application software running on the mobile communications device of the subscriber.

It is another object of the present invention to provide a real-time internet method for tracking the population and gender of patrons in bar and night club establishments wherein subscribers can rate and comment on the establishments they frequent and identify which establishments they have, are, and will be frequenting.

It is another object of the present invention to provide a real-time internet method for tracking the population and gender of patrons in bar and night club wherein subscribers can upload and share pictures of their favorite establishments.

It is another object of the present invention to provide a real-time internet method for tracking the population and gender of patrons in bar and night club establishments wherein subscribers can communicate, or "live chat" with fellow subscribers and others about the attributes of various establishments.

It is another object of the present invention to provide a real-time internet method for tracking the population and gender of patrons in bar and night club establishments wherein subscribers can send customized messages advising one another on which establishments they will be frequenting.

It is another object of the present invention to provide a real-time internet method for tracking the population and gender of patrons in bar and night club establishments wherein subscribers can access information posted to both the system website and the smart phone application on their mobile communications device seven days a week, 365 days a year, with the information being refreshed in real-time as patrons enter the establishments.

The above objects are obtained by the present invention which is a computer-readable medium containing instructions for a computer to perform a method for tracking the population and gender of patrons in a bar or night club establishment, in real-time via the internet. The establishment has a scanner for reading information from the driver's license of a visitor seeking entrance to the establishment. The method includes the steps of: scanning the information on the driver's license presented by each visitor seeking entrance to the establishment, and storing the time of the scan; verifying that the driver's license is valid and that the visitor is above the legal drinking age; creating a patron identification code associated with the visitor, if the scanned license is valid and the visitor is above the legal drinking age; ascertaining the gender of the visitor associated with the patron identification code; forwarding the scanned information, gender information, patron identification code and the scan time to the system server; causing the system server to tally the forwarded gender information in real-time; displaying the tallied gender information on a system website; and permitting a system subscriber to access the system website to view the displayed gender information.

The method further includes the steps of causing the system server to tally the number of forwarded patron identification codes in real-time and displaying same on the system website.

The system subscriber may access the system website using a software application running on his mobile communications device. Alternatively, the system subscriber may access the system website directly via the internet after logging into the system.

The method further includes the steps of: registering the establishment with the system server; uploading information to the system server regarding the attributes of the registered establishment; displaying the uploaded establishment attribute information on the system website; and permitting system subscribers to access the displayed establishment attribute information on the system website.

The method further includes the steps of: associating an establishment identification code with the registered establishment; and forwarding the establishment identification information to the system server along with the patron identification code.

The method further includes the steps of: calculating the ratio of forwarded male gender information and the forwarded female gender information and displaying the calculated gender ratio on the system website.

The method further includes the steps of: calculating the rate at which the forwarded male gender information and forwarded female gender information changes over time and displaying the gender rate ratio on the system website.

The method further includes the steps of: registering a second establishment with the system server; associating an establishment identification code with the second registered establishment; scanning the driver's license presented by each visitor, as the visitor enters the second establishment, along with the time that the license was scanned; verifying that the scanned license is valid and that the visitor is above the legal drinking age, and, if so, creating a patron identification code associated with the visitor; forwarding the patron identification code, scan time and establishment identification information for the second registered establishment to the system server; and reducing the number of patron identification codes associated with the first establishment when the system server receives scanned information from the same driver's license associated with the establishment identification code of the second establishment.

The method further includes the steps of: ascertaining whether a person seeking access to the system website is a registered system subscriber; and, if the person is a registered system subscriber, permitting access to the system website upon entering credentials; and if the person seeking access to the system website is not a registered system subscriber, creating an account for the person and permitting the person to access to the system website.

The method further includes the step of storing the scanned information, gender information, patron identification code and the scan time at the system server.

The method further includes the step of storing the information relating to the attributes of the registered establishment and establishment identification code at the system server.

The method further includes the step of storing account information for each registered system subscriber at the system server.

In accordance with another aspect of the present invention, a computer-readable medium containing instructions is provided for a computer to perform a method of tracking patrons at multiple establishments and providing information relating to same to subscribers via the Internet. Each establishment has a scanner for reading a driver's license and storing the scanned information. The method includes the steps of: associating a unique establishment identification code with each establishment; scanning the information on the driver's license presented by each visitor seeking entrance to a first establishment, and storing the time of the scan; verifying that the driver's license is valid and that the visitor is above the legal drinking age; creating a patron identification code associated with the visitor, if the scanned license is valid and the visitor is above the legal drinking age; ascertaining the gender of the visitor associated with the patron identification code; forwarding the scanned information, gender information, patron identification code, establishment identification code and the scan time to the system server; causing the system server to tally the forwarded gender information for the first establishment in real-time; displaying the tallied gender information for the first establishment on a system website; and permitting a system subscriber to access the tallied gender information displayed on the system website.

The method further comprises the steps of: causing the system server to tally the number of forwarded patron identification codes associated with the first establishment in real-time and displaying the tally of forwarded patron identification codes associated with the first establishment on the system website.

The method further comprises the step of the using a software application running on a mobile communications device of the system subscriber to access the system website.

The method further comprises the step of accessing the system website via the internet after the system subscriber logs into the system.

The method further comprising the steps of: uploading information to the system server regarding the attributes of the first establishment; and displaying the uploaded establishment information on the system web site.

The method further comprises the step of forwarding the establishment identification code associated with the first establishment to the system server, along with the patron identification code.

The method further comprises the steps of: calculating the ratio of forwarded male gender information and forwarded female gender information associated with the first establishment; and displaying the calculated gender ratio on the system website.

The method further comprises the steps of: calculating the rate at which ratio of forwarded male gender information and forwarded female gender information associated with the first establishment changes over time and displaying the gender rate ratio on the system website.

The method further comprises the steps of: scanning information from the driver's license presented by each visitor, as the visitor enters the second establishment; verifying that the scanned driver's license is valid and that the visitor is above the legal drinking age, and, if so, creating a patron identification code associated with the visitor to the second establishment; forwarding the patron identification code and establishment identification information for the second registered establishment to the system server; and reducing the tally of patron identification codes associated with the first establishment when the system server receives scanned information from the same driver's license associated with the establishment identification code of the second establishment.

The method further comprises the steps of: ascertaining whether a person seeking to access to the system website is a registered system subscriber; if the person is a registered system subscriber, permitting access to the system website upon entering credentials; and if the person seeking access to the system website is not a registered system subscriber, creating an account for the person and permitting access to the system website.

The method further comprises the step of storing the scanned information, gender information, patron identification code and the scan time at the system server.

The method further comprises the step of storing the attributes of the first establishment and identification code associated with the first establishment at the system server.

The method further comprises the step of storing the account information for each system subscriber at the system server.

BRIEF DESCRIPTION OF THE SEVERAL VIEWS OF DRAWINGS

To these and to such other objects that may hereinafter appears, the present invention relates to a computer-readable medium containing instructions for a computer to perform a real-time method of tracking the number and gender of patrons in a bar or night club establishment as described in detail in the following specification and recited in the annexed claims, taken together with the accompanying drawings, in which like numerals refer to like parts and in which:

FIG. 4 is a context diagram for the system that performs the method of the present invention under the instructions of the computer-readable medium.

DETAILED DESCRIPTION OF THE INVENTION

Figure 3:
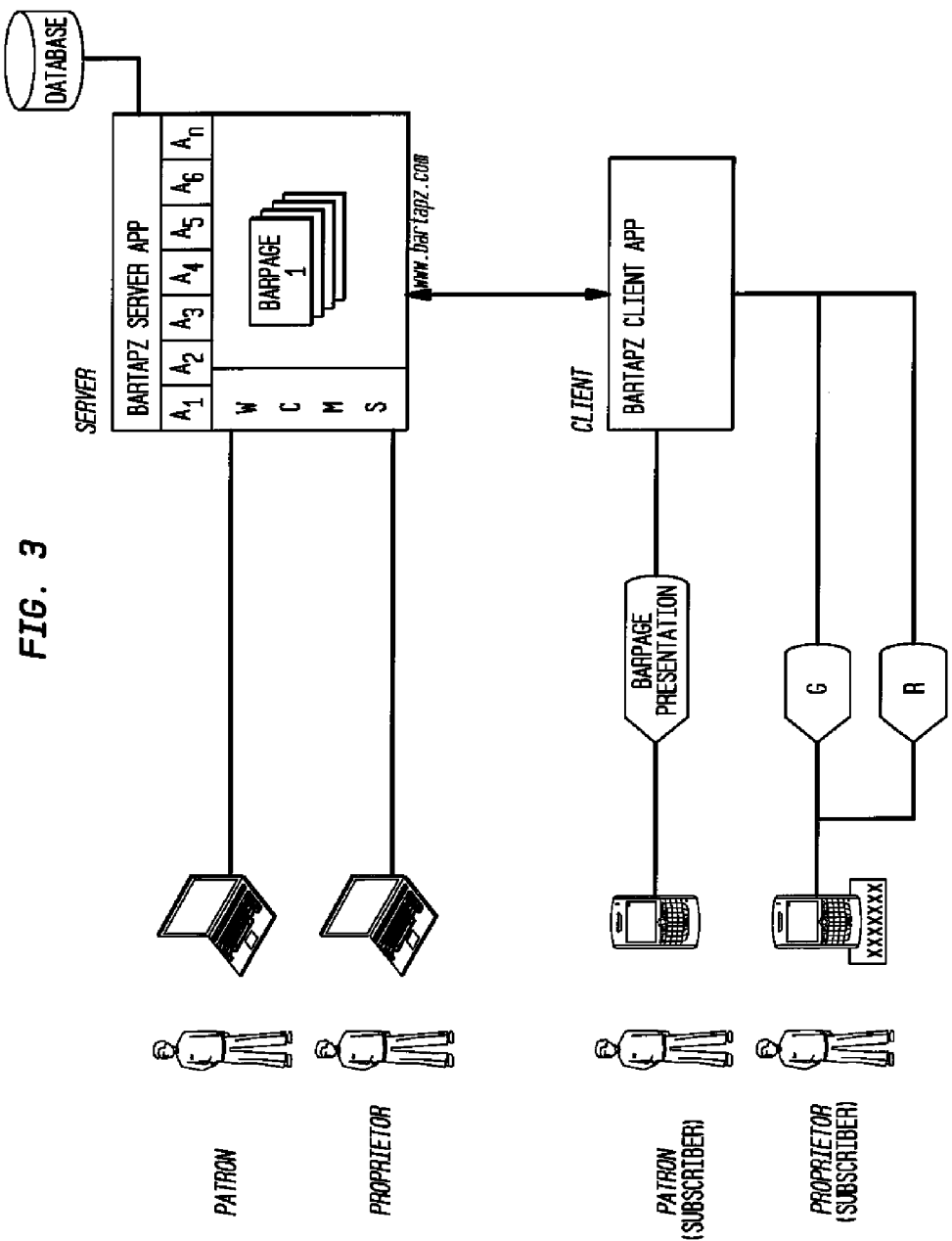
FIG. 3 is use case diagram for the system that performs the method of the present invention under the instructions of the computer-readable medium.

As shown in FIG. 3, the method of the present invention is performed on a system, referred to herein as the "BarTapz" system. The Bartapz system utilizes a software application, referred to herein as the "Bartapz Client App", capable of running on a mobile communications device. It also includes a system server capable of running a software application, herein referred to as the "Bartapz Server App", which includes a system website.

In order to participate in the BarTapz system, a proprietor of a bar or night club establishment registers his establishment with the BarTapz System server, which runs the BarTapz Server App software. The proprietor accesses the system through the system website (www.bartapz.com) to obtain a unique establishment identification code. Subscribers may browse the Bartapz website to access the web pages of various registered establishments to better plan their evening.

Figure 1:
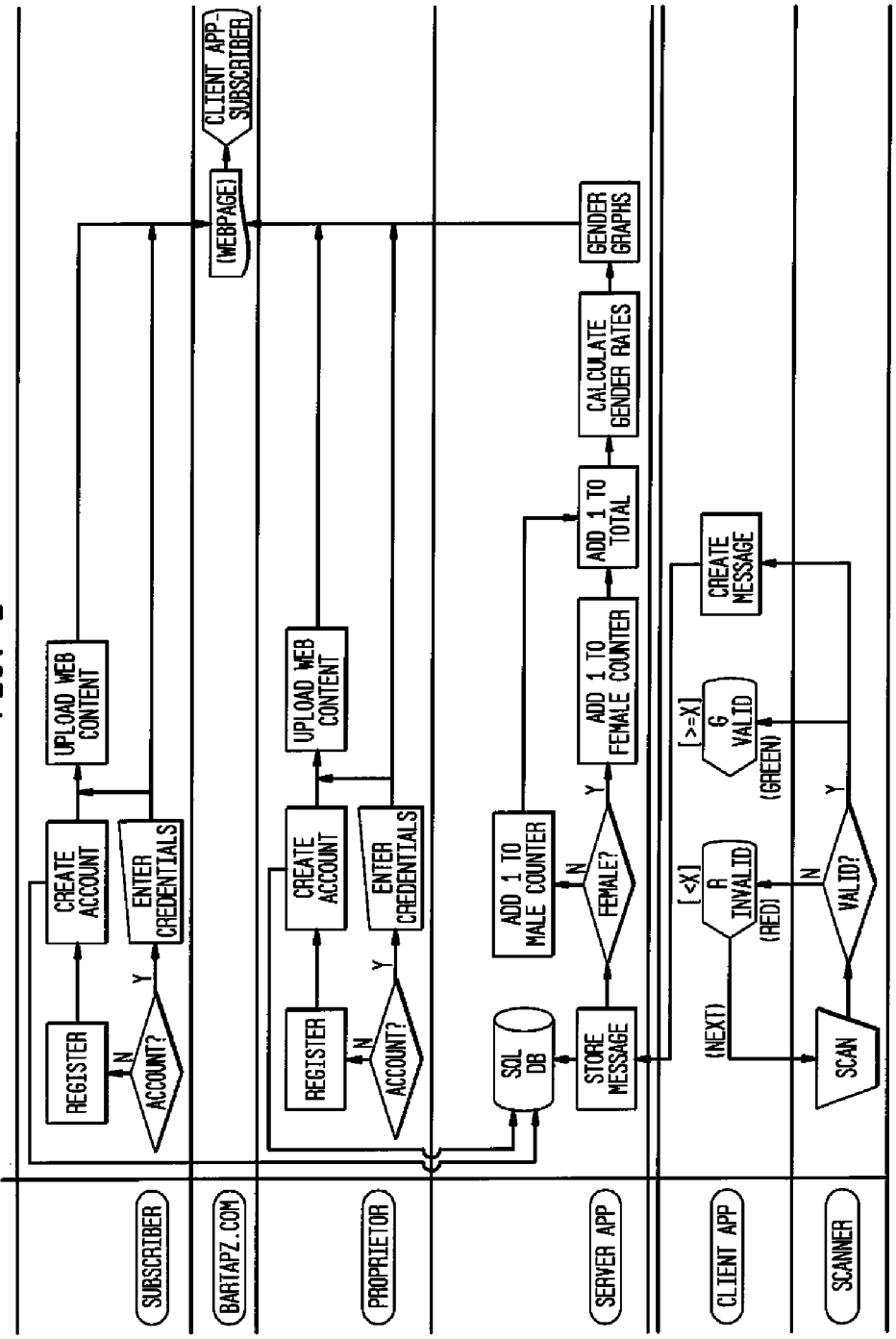
FIG. 1 is a flowchart of the system that performs the method of the present invention under the instructions of the computer-readable medium.

As illustrated in FIG. 1, as the proprietor enters the system, the server determines if the establishment already has an account. If not, the system creates an account and associates the establishment with an establishment identification code unique to that establishment. Once the account is created, the proprietor may access the system at any time and upload information about the registered establishment to the system website. As long as the proprietor has a valid establishment identification code, he can log into the system server at any time to change or update information about his establishment, using the establishment identification code.

An individual that wishes to use the system as a patron also must register with the system server and obtain a patron identification code. The individual accesses the system server through the website. The system server determines if the individual has previously registered. If not, an account is created for the individual and a unique patron identification code is associated with the individual. Thereafter, the individual can access the system website at any time by presenting his credentials in the form of his patron identification code.

Registered patrons and registered proprietors are considered to be "subscribers". Once registered, the system server provides each subscriber patron and each subscriber establishment proprietor with the Bartapz Client App software for installation on their mobile communications devices, which may be purchased from the system provider as part of the subscription fee or may be obtained elsewhere.

The mobile communications devices used by subscribers in the system may be any conventional mobile communications device capable of running the Bartapz Client App software. Those devices may for example be an iPhone, or iPod Touch, or any similar device capable of running the Bartapz Client Application software which acts as an interface between the subscriber and the system server. That software allows the device of the proprietor of a registered establishment to send and receive messages to and from the system server. The Bartapz Server App software provides the registered proprietor with web page space to upload information about the establishment, including, but not limited to, menus, featured specials, venues, photos, location information, travel directions, entertainment offered and downloadable discount coupons for use at the establishment. The web page will also display real-time statistics about the number of patrons that have entered the establishment so far that evening, the gender ratio of those patrons and the gender rate ratio of those patrons from which a trend may be inferred.

The mobile communications device of the subscriber proprietor is connected to a scanner which allows the information on a driver's license presented by a visitor entering the establishment to be scanned, decoded and saved.

The scanner may be any suitable device capable of scanning a driver's license, such as a DL Code Reader, including a Linear Pro iPod Touch portable Barcode Scanner—2D (PDF417) and Magnetic stripe reader, or a UniMag Mobile Magstripe Reader for iPhone 3G/3Gs/4. The scanner is controlled by a device driver (not shown) such as iMag by IDTech for iPhones and iPod Touch.

Using the VeriAgeApp from Nautilus or similar software, the device driver interfaces with a thin client application to connect to a remote database where it can be determined if the license of the visitor is valid. If the license is valid, and the scanned information indicates that the visitor is over the legal drinking age, a green light (G) or other indication thereof may be displayed on the mobile communications device. On the other hand, if the license is invalid or if the scanned information indicates that the person is below the legal drinking age, a red light (R) or other indication thereof may be displayed.

If the license is valid, and the scanned information indicates that the person is over the legal drinking age, the visitor is considered to be a "patron'. The BarTapz Client App, which runs on the subscriber proprietor's mobile communications device, communicates with the BarTapz system server, which runs the BarTapz Server App software, by creating and sending messages with verified information about the patron, including, but not limited to, the time the license of the patron was scanned and the gender of the patron.

The system server receives the message from the subscriber proprietor's mobile communications device which includes the scanned information, a unique patron identification code associated with each patron, along with the gender of the patron, a timestamp reflecting the time the patron's license was scanned, and the unique establishment identification code associated with the establishment that the patron has entered. The message is saved in a database which is part of the system server.

The system server tallies the number of patron identification codes reflecting the number of patrons that have been admitted to the establishment matching the establishment identification code and counts the number of female and male patrons. It then calculates the gender ratio (the number of males divided by the number of females) and calculates the gender rate ratio (the change in the number of males per unit time divided by the change in the number of females per unit time). The system server creates a display in real-time reflecting the current population of patrons, the gender ratio of those patrons and the gender rate ratio of those patrons, which may be in the form of a numerical readout, a graph or other pictorial representation, or both. The display is then posted on the web page of the system website dedicated to the establishment whose unique establishment identification code accompanied those patron identification codes.

The database of the system server stores the patron and proprietor information and permits same to be accesses the system with the appropriate identification codes. The system server software uses a web content management system (wcms) to update the webpages of subscribed proprietors and allows subscriber patrons to participate in discussion (blog) with other subscribers as well as to provide input for a system of rating a subscriber establishment.

A patron may also purchase an application that allows them "member's-only" access to additional features on any registered establishment's pages, which may include, but is not limited to, the establishment's current gender trend, pushed special feature and venue information, and real-time timestamped attendee logs ("tapz") tracking the attendance of predefined individuals referred to as "friendz". The system server software may push "tapz" to patron subscribers and display the positions of "friendz" in the establishment. It can also receive and send messages to and from "friendz".

Figure 2:
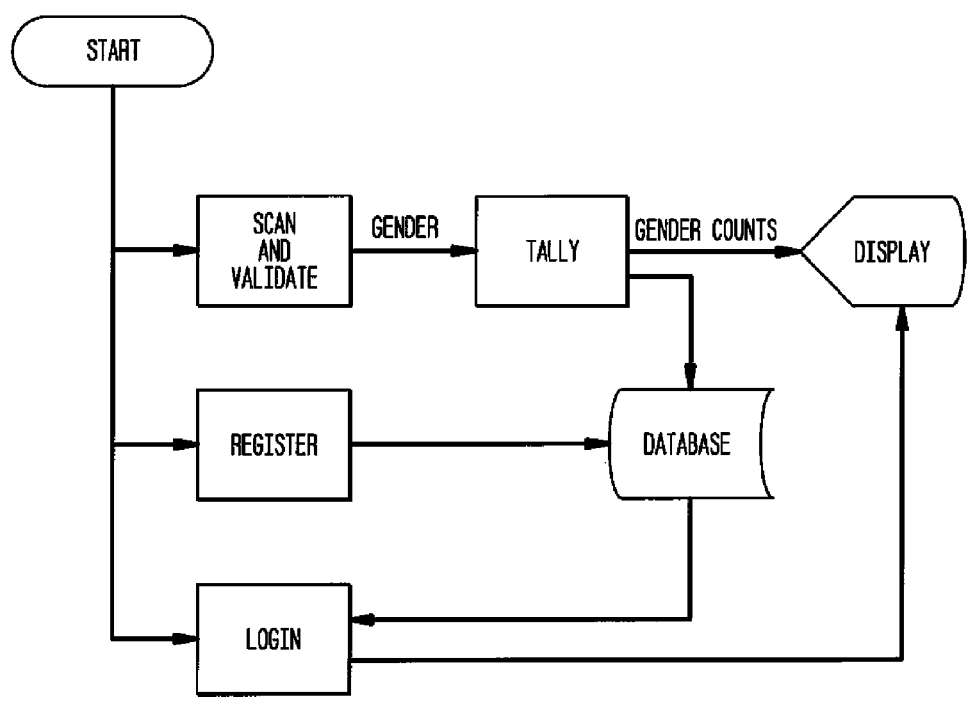
FIG. 2 is a data flow diagram for the system that performs the method of the present invention under the instructions of the computer-readable medium.

FIG. 2 illustrates how data flows through the system. After registering for the system, the database stores information about the credentials of the patron or establishment, including the appropriate identification code. Thereafter, access to the system by a subscriber is obtained by logging in with the identification code. As indicated above, the driver's licenses of visitors entering a registered establishment are scanned and validated. Gender information from the scanned licenses is collected, tallied, stored and displayed. That information is provided to subscriber patrons that are logged into the system.

FIG. 4 illustrates the flow of information through the system which is preferably accomplished by information requests and responses. Visitors enter a registered establishment and have their driver's licenses scanned. If the license is validated and if the age of the visitor is over the legal drinking age, the visitor becomes a patron and is granted entrance to the establishment. At the same time, validated information from the license and the patron information are forwarded to the system server which runs the BarTapz Server App software.

A patron may request registration and subsequent login. A proprietor may request registration, use the establishment identification code to login and provide establishment information uploads including but not limited to photos, venues, specials, coupons or other establishment related information.

Requests for information can be made by any actor to the system server. For example, a request from a subscriber may be a subscriber login, a photo or blog upload to the web page of a registered establishment, and requests for "members-only" information pertaining to the establishment, such as, but not limited to, position of "friendz" relative to the subscriber, gender rate ratio, and access to external servers, including but not limited to those providing social networking services, location services or the like. The subscriber may search establishments by area (country, state, city, county or zip code) and may post messages or participate in chat rooms.

Responses may include any information, depending upon context, returned in response to a request. For example, a response to a subscriber request may contain subscriber web pages(s) containing any pushed and/or members-only information, including but not limited to venues, coupons, specials, gender rate ratio and population, friends that have visited {"tapz"), messages to/from "friendz", the positions of "friendz" relative to the user (using smart phones' GPS or WiFi), location, directions etc. These messages may be sent to the subscriber's mobile communications device and/or placed on the subscriber's greeting page upon login.

A response to a patron's request may include an acknowledgement of acceptance of credentials. A response of the system may include a proprietor response, including acknowledgement of accepted credentials, and establishment page visitor tracking statistics, and proprietor page(s) containing their establishment-specific information. Those messages may be sent to the proprietor's mobile communications device and/or placed in the proprietors greeting page upon login.

Although patrons will not have their licenses scanned upon exit, if a patron is granted entrance that same evening to another registered establishment using the same (previously scanned) driver's license, their attendance will be removed from the population and gender count of the previous establishment and added to the current establishment's count. The tally for each subscriber establishment will be zeroed at the establishment's closing time.

An appropriately enabled smart phone's GPS or WiFi access id may enable a subscriber to locate their pre-determined "friendz" in a particular establishment. Subscribers will be able to know exactly where their pre-determined "friendz" are located in a particular establishment via a room map application that depicts the subscriber as a blue dot and all "friendz" in the establishment as red dots. Hovering over, or touching, a particular dot will display the name. Accordingly, a subscriber can determine, in real time, if a particular friend has left the establishment.

Effectively, the trending information will become a real-time gender rate ratio. This feature will allow for the calculation of the actual number of patrons that have entered an establishment and determine if the establishment is approaching maximum capacity as dictated by the applicable building code.

A subscriber only may view the whereabouts of predetermined "friendz" and only predetermined "friendz" may view the whereabouts of the subscriber. Similar applications for this feature may permit parents, guardians, or chaperones to monitor underage or handicapped charges.

It will now be appreciated that the present invention relates to a computer-readable medium containing instructions for a computer to perform a method for tracking patrons at a bar or night club establishment and providing information relating to same to system subscribers via the Internet. Each subscriber establishment has a scanner capable of reading information from the driver's license of a visitor entering the establishment.

The method includes scanning the driver's license presented by each visitor, as the visitor enters the establishment; verifying that the scanned license is valid and that the visitor is above the legal drinking age; creating and storing an identification code for the visitor along with the time that the scan took place; ascertaining the gender of the visitor; forwarding the scanned information, gender information, identification code and the scan time to the system server; causing the system server to tally the gender information for visitors to the establishment; displaying the tallied gender information on a system website; and permitting a system subscriber to access the displayed gender information on the system website.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. A non-transitory computer-readable medium containing instructions for a computer to perform a method for tracking visitors having a gender to a first establishment and providing information relating to the visitors to a system subscriber via the Internet, wherein the first establishment has a scanner for reading information from a driver's license, the method comprising the steps of:
   (a) scanning the information on the driver's license presented by each visitor seeking entrance to the first establishment, and storing the time of the scan;
   (b) verifying that the driver's license is valid and that the visitor is above the legal drinking age;
   (c) creating a patron identification code associated with the visitor, if the scanned license is valid and the visitor is above the legal drinking age;
   (d) ascertaining the gender of the visitor associated with the patron identification code;
   (e) creating and forwarding a message including the scanned information, gender information, patron identification code and the scan time to a system server;
   (f) causing the system server to automatically tally the forwarded gender information each time a message is received;
   (g) displaying the tallied gender information for the first establishment on a system website; and
   (h) permitting a system subscriber to access the gender information displayed on the system website.

2. The medium of claim 1 wherein the method further comprises the steps of: causing the system server to tally the number of forwarded patron identification codes in real-time and displaying the tally of forwarded patron identification codes on the system website.

3. The medium of claim 1 wherein the method further comprises the step of the using a software application running on a mobile communications device of the system subscriber to access the system website.

4. The medium of claim 1 wherein the method further comprises the step of accessing the system website via the internet after the system subscriber logs into the system.

5. The medium of claim 1 wherein the method further comprising the steps of:

(a) registering the first establishment with the system server;
(b) uploading information to the system server regarding the attributes of the registered first establishment;
(c) displaying the uploaded establishment information on the system website; and
(d) permitting a system subscriber to access the displayed establishment information on the system website.

6. The medium of claim 5 wherein method further comprises the step of storing the attributes of the registered first establishment and identification code associated with the first establishment at the system server.

7. The medium of claim 1 wherein the method further comprises the steps of;
(a) associating an establishment identification code with the registered first establishment; and
(b) forwarding the establishment identification code associated with the first establishment to the system server, along with the patron identification code.

8. The medium of claim 7 wherein method further comprises the steps of:
(a) registering a second establishment with the system server;
(b) associating an establishment identification code with the second registered establishment;
(c) scanning information from the driver's license presented by each visitor, as the visitor enters the second establishment;
(d) verifying that the scanned driver's license is valid and that the visitor is above the legal drinking age, and, if so, creating a patron identification code associated with the visitor to the second establishment;
(e) forwarding the patron identification code and establishment identification information for the second registered establishment to the system server; and
(f) reducing the tally of patron identification codes associated with the first establishment when the system server receives scanned information from the same driver's license associated with the establishment identification code of the second establishment.

9. The medium of claim 1 wherein the method further comprises the steps of:
(a) calculating the ratio of forwarded male gender information and forwarded female gender information; and
(b) displaying the calculated gender ratio on the system website.

10. The medium of claim 1 wherein the method further comprises the steps of:
(a) calculating the rate at which ratio of forwarded male gender information and forwarded female gender information changes over time and displaying the gender rate ratio on the system website.

11. The medium of claim 1 wherein method further comprises the steps of:
(a) ascertaining whether a person seeking to access to the system website is a registered system subscriber;
(b) if the person is a registered system subscriber, permitting access to the system website upon entering credentials; and
(c) if the person seeking access to the system website is not a registered system subscriber, creating an account for the person and permitting access to the system website.

12. The medium of claim 11 wherein method further comprises the step of storing the account information for each system subscriber at the system server.

13. The medium of claim 1 wherein method further comprises the step of storing the scanned information, gender information, patron identification code and the scan time at the system server.

14. A non-transitory computer-readable medium containing instructions for a computer to perform a method for tracking visitors having a gender at multiple establishments and providing information relating to the visitors to a system subscriber via the Internet, wherein each establishment has a scanner for reading information from a driver's license, the method comprising the steps of:
(a) associating a unique establishment identification code with each establishment;
(b) scanning the information on the driver's license presented by each visitor seeking entrance to a first establishment, and storing the time of the scan;
(c) verifying that the driver's license is valid and that the visitor is above the legal drinking age;
(d) creating a patron identification code associated with the visitor, if the scanned license is valid and the visitor is above the legal drinking age;
(e) ascertaining the gender of the visitor associated with the patron identification code;
(f) creating and forwarding a message including the scanned information, gender information, patron identification code, establishment identification code and the scan time to a system server;
(g) causing the system server to automatically tally the forwarded gender information for the first establishment each time a message is received;
(h) displaying the tallied gender information for the first establishment on a system website; and
(i) permitting a system subscriber to access the tallied gender information displayed on the system website.

15. The medium of claim 14 wherein the method further comprises the steps of: causing the system server to tally the number of forwarded patron identification codes associated with the first establishment in real-time and displaying the tally of forwarded patron identification codes associated with the first establishment on the system website.

16. The medium of claim 14 wherein the method further comprises the step of the using a software application running on a mobile communications device of the system subscriber to access the system website.

17. The medium of claim 14 wherein the method further comprises the step of accessing the system website via the internet after the system subscriber logs into the system.

18. The medium of claim 14 wherein the method further comprising the steps of:
(a) uploading information to the system server regarding the attributes of the first establishment; and
(b) displaying the uploaded establishment information on the system website.

19. The medium of claim 14 wherein the method further comprises the step of forwarding the establishment identification code associated with the first establishment to the system server, along with the patron identification code.

20. The medium of claim 14 wherein the method further comprises the steps of:
(a) calculating the ratio of forwarded male gender information and forwarded female gender information associated with the first establishment; and
(b) displaying the calculated gender ratio on the system website.

21. The medium of claim 14 wherein the method further comprises the steps of:

(a) calculating the rate at which ratio of forwarded male gender information and forwarded female gender information associated with the first establishment changes over time and displaying the gender rate ratio on the system website.

22. The medium of claim 14 wherein method further comprises the steps of:
(a) scanning information from the driver's license presented by each visitor, as the visitor enters the second establishment;
(b) verifying that the scanned driver's license is valid and that the visitor is above the legal drinking age, and, if so, creating a patron identification code associated with the visitor to the second establishment;
(c) forwarding the patron identification code and establishment identification information for the second registered establishment to the system server; and
(d) reducing the tally of patron identification codes associated with the first establishment when the system server receives scanned information from the same driver's license associated with the establishment identification code of the second establishment.

23. The medium of claim 14 wherein method further comprises the steps of:
(a) ascertaining whether a person seeking to access to the system website is a registered system subscriber;
(b) if the person is a registered system subscriber, permitting access to the system website upon entering credentials; and
(c) if the person seeking access to the system website is not a registered system subscriber, creating an account for the person and permitting access to the system website.

24. The medium of claim 23 wherein method further comprises the step of storing the account information for each system subscriber at the system server.

25. The medium of claim 14 wherein method further comprises the step of storing the scanned information, gender information, patron identification code and the scan time at the system server.

26. The medium of claim 14 wherein method further comprises the step of storing the attributes of the first establishment and identification code associated with the first establishment at the system server.

* * * * *